United States Patent [19]

Job

[11] Patent Number: 5,077,357

[45] Date of Patent: Dec. 31, 1991

[54] OLEFIN POLYMERIZATION CATALYST

[75] Inventor: Robert C. Job, Houston, Tex.

[73] Assignee: Shell Oil Company, Houston, Tex.

[21] Appl. No.: 600,898

[22] Filed: Oct. 22, 1990

[51] Int. Cl.$^5$ .................................... C08F 4/654
[52] U.S. Cl. ............................. 526/119; 502/125; 502/127; 526/351
[58] Field of Search .......................... 526/119, 124

[56] References Cited

U.S. PATENT DOCUMENTS

| | | | |
|---|---|---|---|
| 3,901,863 | 8/1975 | Berger et al. | 526/119 X |
| 4,330,649 | 5/1982 | Kioka et al. | 526/125 |
| 4,472,521 | 9/1984 | Band | 502/104 |
| 4,540,679 | 9/1985 | Arzoumanidis | 502/111 |
| 4,710,482 | 12/1987 | Job | 502/127 |
| 4,728,705 | 3/1988 | Nestlerode et al. | 526/125 |
| 4,902,761 | 2/1990 | Suga et al. | 526/119 |
| 4,935,394 | 6/1990 | Chang | 526/124 X |
| 4,985,515 | 1/1991 | Matsuura et al. | 526/119 X |

*Primary Examiner*—Patrick P. Garvin

[57] ABSTRACT

An improved olefin polymerization process employs an olefin polymerization catalyst produced from a polymerization procatalyst made from a magnesium alkoxide, a titanium tetraalkoxide, a tetravalent titanium halide, a phenolic compound and an alkanol. The procatalyst precursor is contacted with a tetravalent titanium halide and an electron donor to form the procatalyst which is subsequently converted to the olefin polymerization catalyst by contact with a cocatalyst and a selectivity control agent.

11 Claims, No Drawings

OLEFIN POLYMERIZATION CATALYST

FIELD OF THE INVENTION

This invention relates to high activity olefin polymerization catalysts and to a method of polymerizing α-olefins which employs such catalysts. More particularly, the invention relates to a complex, solid magnesium-containing, titanium-containing precursor of an olefin polymerization catalyst component and to the component and the catalyst produced therefrom.

BACKGROUND OF THE INVENTION

The production of polymers or copolymers of lower α-olefins, particularly ethylene and propylene, has gained substantial commercial acceptance. The polymeric products are inexpensive and exhibit a number of commercially useful properties. In the case of the polymerization of ethylene, the process is relatively uncomplicated in that the product type is not influenced by the manner in which the ethylene molecules add to the growing polymer chain and the polymeric product does not exist in stereoisomeric forms.

In the case of the polymerization of propylene, however, the presence of pendant methyl groups on the polymeric chain provides the possibility of several types of product depending upon the steric regularity with which the propylene units add to the growing polymer chain. Much, if not most, of the commercial polypropylene is crystalline and results from the stereoregular addition of propylene units in a regular head-to-tail manner. The polypropylene in which the addition of units is random is termed atactic. This amorphous form is generally less desirable and, if present in significant quantities, must be removed as by extraction in order to obtain a more desirable crystalline product.

Also significant from a commerical standpoint is the activity of the polymerization catalyst. A number of the early polymerization catalysts, e.g., trivalent titanium, chromium or vanadium catalysts, were of relatively low activity and the polyolefin product contained a significant proportion of catalyst residues. The removal of such residues as by a deashing step was required in order to obtain commerically acceptable properties. The more recent olefin polymerization catalysts are stereo-regular and of sufficient activity so that extraction and/or deashing steps are not required.

In the terms now conventionally employed for the components, the high activity olefin polymerization catalysts are formed from a procatalyst which typically contains magnesium, titanium and halide moieties as well as an electron donor, a cocatalyst which is usually an organoaluminum compound and a selectivity control agent which may be provided as a partial or total complex with the cocatalyst. Although each of the components has a considerable influence on the polymerization catalyst and process and the polymer product thereby produced, the nature of the catalyst as well as the polymerization product seems to be most influenced by the procatalyst. Much of the research directed toward improvement of the olefin polymerization process has been directed toward improvement of the procatalyst component.

Kioka et al, U.S. Pat. No. 4,300,649, describe a solid catalyst component (procatalyst) obtained by heating a soluble magnesium compound such as magnesium chloride with a higher alcohol in the presence of an ester to produce a solution which is added to titanium tetrachloride and an electron donor to form the procatalyst. Band, U.S. Pat. No. 4,472,521, reacts a magnesium alkoxide with a titanium alkoxide wherein each alkoxide has 4 or more carbon atoms in the presence of aromatic hydrocarbon. Titanium tetrachloride and an electron donor are added to the resulting solution to form a procatalyst which is post-treated with transition metal halide. Arzoumanidis et al, U.S. Pat. No. 4,540,679, produce a catalyst component by contacting a suspension of magnesium ethoxide in ethanol with carbon dioxide. The addition of an organoaluminum compound in hydrocarbon solvent to the resulting solution produces spherical particles which are used as a support for titanium moieties upon contacting the particles with titanium tetrachloride. Nestlerode et al, U.S. Pat. No. 4,728,705, solubilize magnesium ethoxide in ethanol with carbon dioxide and spray dry the resulting solution or alternatively use the solution to impregnate catalyst support particles. The particles resulting from either modification are useful in the production of a procatalyst of desirable morphology.

A somewhat different type of catalyst component precursor is described by Job, U.S. Pat. No. 4,710,428, wherein a crystalline magnesium compound of the general formula $$Mg_4(OR)_6(ROH)_{10}A \qquad (I)$$

is formed in which R independently is lower alkyl of up to 4 carbon atoms inclusive and A is one or more anions having a total oxidation state of −2. This complex magnesium compound is contacted with a tetravelent titanium halide and an electron donor to form an olefin polymerization procatalyst. The use of such insoluble magnesium compounds has certain advantages in that the olefin polymerization catalysts produced from such complexes by way of the intermediate procatalyst are good high activity polymerization catalysts, particularly for the polymerization or copolymerization of propylene and produce polymer of predetermined morphology. It would be of advantage, however, to provide improved olefin polymerization catalysts.

SUMMARY OF THE INVENTION

The present invention provides solid, magnesium-containing, titanium-containing olefin polymerization procatalyst precursor and the procatalyst and olefin polymerization catalyst produced therefrom. The present invention also provides the improved process of polymerizing lower α-olefins which employs such catalyst. The catalyst of the invention is a high activity olefin polymerization catalyst and its use results in production of polyolefin product of good properties in an improved yield.

DESCRIPTION OF THE INVENTION

The present invention contemplates the production of a complex, solid olefin polymerization procatalyst precursor containing moieties of magnesium and titanium and probably moieties of at least some of halide, alkoxide and a phenolic compound. Such complex procatalyst precursors are produced by contacting a magnesium alkoxide, a titanium alkoxide, a titanium halide, a phenolic compound and an alkanol. Removal of alkanol from the resulting solution provides the solid procatalyst precursor as opaque, spheroidal particles. The procatalyst precursor is contacted with a tetravalent titanium halide, a halohydrocarbon and an electron donor to form the procatalyst which in turn is contacted with an organoalumnum cocatalyst and a selectivity control agent to form the olefin polymerization catalyst.

The solid olefin polymerization procatalyst precursor is a complex of indefinite stoichiometry formed from a magnesium alkoxide, a tetravalent titanium alkoxide, a titanium tetrahalide, a phenolic compound and an alkanol. The alkoxide moieties in these reactants independently have up to 4 carbon atoms inclusive. The alkoxide moieties within one reactant are the same or different if more than one alkoxide moiety is present, and the alkoxide moieties of one reactant are the same as or different from alkoxide moieties in other reactants. Although alkoxide moieties such as methoxide, propoxide, isopropoxide and butoxide are useful, the preferred alkoxide moieties are ethoxide. The halide moieties of the titanium tetrahalide are preferably chloride or bromide with chloride being particularly preferred.

The phenolic compound used in the production of the procatalyst precursor is selected from phenol or activating group-substituted phenol. By the term "activating group" is meant an aromatic ring carbon atom substituent free from active hydrogens which is ortho-para directing for conventional aromatic ring substitution and which is generally but not invariably electron donating. Illustrative of such groups are alkyl of up to 5 carbon atoms inclusive, e.g., methyl, ethyl, isopropyl or n-butyl; alkoxy of up to 5 carbon atoms, e.g., methoxy, ethoxy or i-propoxy; halo, particularly chloro or bromo; and dialkylamino wherein each alkyl independently has up to 5 carbon atoms inclusive such as dimethylamino, diethylamino and methylpropylamino. Illustrative of phenolic compounds which are useful in the production of the procatalyst precursor are phenol, o-cresol, p-cresol, 3-methoxyphenol, 4-dimethylaminophenol, 2,6-di-tert-butyl-4-methylphenol and p-chlorophenol. Of such phenolic compounds the use of alkyl-substituted phenol is preferred and particularly preferred is the use of o-cresol.

The complex, solid procatalyst precursor is produced by contacting the reactants in an inert reaction diluent. The diluent is suitably a hydrocarbon diluent such as isopentane, isooctane, cyclohexane or toluene or a halohydrocarbon such as methylene chloride or chlorobenzene. Isooctane is a preferred hydrocarbon diluent and chlorobenzene is a preferred halohydrocarbon diluent. As stated, the formation of the procatalyst precursor does not appear to observe conventional molar stoichiometry. However, the production of the precursor is illustrated by the following partial general equation which employs the preferred alkoxide and halide moieties,

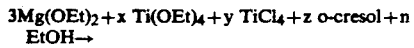

wherein y is more than about 0.1 but less than about 0.8, preferably more than 0.3 but less than 0.5, (x+y) is more than about 0.2 but less than about 3, preferably more than about 0.5 but less than about 2, z is more than about 0.05 but less than about 3, preferably more than about 0.1 but less than about 2, and n is more than about 0.5 but less than about 9, preferably more than about 2 but less than about 5.

The initial interaction of the reactants in the reaction diluent takes place in a non-gaseous state at a moderate reaction temperature. Suitable reaction temperatures are from about 30° C. to about 120° C., preferably from about 35° C. to about 90° C. This initial heating results in the formation of a generally clear solution. This solution is then heated to a higher temperature to remove alkanol, ethanol in the preferred modification, typically as an azeotrope with a portion of the inert diluent. The temperature of this second heating will depend in part on the boiling point of any azeotrope containing alkanol which is formed. Typical heating (azeotroping) temperatures are from about 70° C. to about 120° C., preferably from about 85° C. to about 110° C. The removal of the alkanol results in the formation of the procatalyst precursor in the form of solid, opaque, spheroidal particles.

The olefin polymerization procatalyst precursor is converted to the procatalyst by reaction with a tetravalent titanium halide, an optional halohydrocarbon and an electron donor. The tetravalent titanium halide is suitably an aryloxy- or alkoxy di- or trihalide such as diethoxytitanium dichloride, dihexyloxytitanium dibromide or diisopropoxytitanium chloride or the tetravalent titanium halide is a titanium tetrahalide such as titanium tetrachloride or titanium tetrabromide. A titanium tetrahalide is preferred as the tetravalent titanium halide and particularly preferred is titanium tetrachloride.

The optional halohydrocarbon employed in the production of olefin polymerization procatalyst is a halohydrocarbon of up to 12 carbon atoms inclusive, preferably up to 9 carbon atoms inclusive, which contains at least one halogen atom and in the case of aliphatic halohydrocarbons contains at least two halogen atoms. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Aromatic halohydrocarbons which are suitably employed are chlorobenzene, bromobenzene, dichlorobenzene and chlorotoluene. Of the aliphatic halohydrocarbons, carbon tetrachloride and 1,1,2-trichloroethane are preferred but particularly preferred is the aromatic halohydrocarbon chlorobenzene.

The electron donors which are suitably utilized in procatalyst production are those electron donors free from active hydrogens which are conventionally employed in the formation of titanium-based procatalysts. Such electron donors include ethers, esters, amines, imines, nitriles, phosphines, stibines, and arsines. The preferred electron donors are esters, particularly alkyl esters of aromatic monocarboxylic or dicarboxylic acids. Examples of such electron donors are methyl benzoate, ethyl benzoate, ethyl p-ethoxybenzoate, ethyl p-methylbenzoate, diethyl phthalate, dimethyl naphthalene dicarboxylate, diisobutyl phthalate and diisopropyl tetrephthalate. The electron donor is a single compound or is a mixture of compounds but preferably the electron donor is a single compound. Of the preferred ester electron donors, ethyl benzoate and diisobutyl phthalate are particularly preferred.

The precise manner in which the procatalyst precursor, the halohydrocarbon and the electron donor are contacted is material but not critical. In one embodiment, the tetravalent titanium halide is added to a mixture of the electron donor and solid procatalyst precursor. Best results are obtained, however, if the electron donor is mixed with the tetravalent titanium halide and halohydrocarbon and the resulting mixture is used to contact the solid procatalyst precursor. Other procedures are also suitable but less preferred. The solid product which results is typically washed at least once with the tetravalent titanium halide and the halohydrocarbon, taken together or employed separately. It is often useful to include an acid chloride, e.g., benzoyl chloride or phthaloyl chloride in at least one wash to further facilitate the replacement of at least a portion of the alkoxide moieties in the procatalyst precursors with halide moieties. This replacement, often termed a halogenation, is well known in the art. The solid olefin polymerization procatalyst which results is then typically washed with a light hydrocarbon such as isooctane to remove soluble titanium compounds.

In the preferred modification the mixture of procatalyst precursor, tetravalent titanium halide, electron donor and halohydrocarbon is maintained at an elevated temperature, for example, a temperature of up to about 150° C. Best results are obtained if the materials are contacted initially at or about ambient temperature and then heated. Sufficient tetravalent titanium halide is provided to convert at least a portion and preferably at least a substantial portion of the alkoxide moieties of the procatalyst precursor to halide groups. This replacement is conducted in one or more contacting operations, each of which is conducted over a period of time ranging from a few minutes to a few hours and it is preferred to have halohydrocarbon present during each contacting. Sufficient electron donor is provided so that the molar ratio of electron donor to the magnesium present in the solid procatalyst is from about 0.01:1 to about 1:1, preferably from about 0.05:1 to about 05:1. The final washing with light hydrocarbon produces a procatalyst which is solid and granular and when dried is storage stable provided that oxygen and active hydrogen compounds are excluded. Alternatively, the procatalyst is used as obtained from the hydrocarbon washing without the need of drying. The procatalyst thus produced is employed in the production of an olefin polymerization catalyst by contacting the procatalyst with a cocatalyst and a selectivity control agent.

The cocatalyst component of the olefin polymerization catalyst is an organoaluminum compound selected from the cocatalysts conventionally employed with titanium-based procatalysts. Illustrative organoaluminum cocatalysts include trialkylaluminum compounds, alkylaluminum alkoxide compounds and alkylaluminum halide compounds in which each alkyl independently has from 2 to 6 carbon atoms inclusive. The preferred organoaluminum cocatalysts are halide free and particularly preferred are the trialkylaluminum compounds such as triethylaluminum, triisopropylaluminum, triisobutylaluminum and diethylhexylaluminum. Triethylaluminum is a preferred trialkyaluminum cocatalyst. The organoaluminum cocatalyst, during formation of the olefin polymerization catalyst, is employed in a molar ratio of aluminum to titanium of the procatalyst of from about 1:1 to about 150:1, but preferably in a molar ratio of from about 10:1 to about 100:1.

The selectivity control agents which are used in the production of olefin polymerization catalyst are those selectivity control agents conventionally employed in conjunction with titanium-based procatalysts and organoaluminum cocatalysts. Illustrative of suitable selectivity control agents are those classes of electron donors employed in procatalyst production as described above as well as organosilane compounds including alkylalkoxysilanes and arylalkoxysilanes of the formula $$R'_r Si(OR)_{4-r} \quad (II)$$

wherein R' independently is aryl or alkyl of up to 10 carbon atoms inclusive, R independently is alkyl of up to 4 carbon atoms inclusive and r is 1 or 2. The preferred selectivity control agents are esters of aromatic monocarboxylic or dicarboxylic acids, particularly alkyl esters, such as ethyl p-ethoxybenzoate, diisobutyl phthalate, and ethyl p-methylbenzoate, or the preferred selectivity control agents are alkylalkoxysilanes such as ethyldiethoxysilane, diisobutyldimethoxysilane, cyclohexylmethyldimethoxysilane or propyltrimethoxysilane. In one modification, the selectivity control agent is a portion of the electron donor added during the procatalyst production. In an alternate modification the selectivity control agent is provided at the time of the contacting of procatalyst and cocatalyst. In either modification the selectivity control agent is provided in a quantity of from about 0.1 mole to about 100 moles per mol of titanium in the procatalyst. Preferred quantities of selectivity control agent are from about 0.5 mole to about 25 mole per mole of titanium in the procatalyst.

The olefin polymerization catalyst is produced by known procedures of contacting the procatalyst, the cocatalyst and the selectivity control agent. The method of contacting is not critical. In one modification the catalyst components are simply mixed in a suitable reactor and the preformed catalyst thereby produced is introduced into the polymerization reactor when initiation of polymerization is desired. In an alternate modification, the catalyst components are introduced into the polymerization reactor where the catalyst is formed in situ.

The olefin polymerization catalyst formed from the complex solid procatalyst precursor by way of the procatalyst is useful in the polymerization under polymerization conditions of lower α-olefins and particularly in the polymerization of straight chain α-olefins of up to 4 carbon atoms, i.e., ethylene, propylene and 1-butene, or mixtures thereof. The precise procedures and conditions of the polymerization are broadly conventional but the olefin polymerization process, by virtue of the use therein of the polymerization catalystt formed from the solid complex procatalyst precursor, provides polyolefin product and particularly polypropylene product having a relatively high bulk density in quantities which reflect the relatively high productivity of the olefin polymerization catalyst. The polymerization product is suitably a homopolymer such as polyethylene or polypropylene, particularly polypropylene, as when a single α-olefin monomer is supplied to the polymerization process. Alternatively, the catalyst and process of the invention are useful in the production of copolymers including copolymers of ethylene and propylene such as EPR and polypropylene impact copolymer as when two or even more α-olefin monomers are supplied to the polymerization process.

Polymerization is suitably conducted under polymerization conditions in a gas-phase process employing one or more fluidized beds of catalyst or is conducted as a slurry-phase process employing as diluent an inert material such as propane or a liquified monomer of the polymerization such as propylene. The molecular weight of the product is customarily influenced by the provision of molecular hydrogen as is known in the art. The polymerization is conducted in a batchwise manner or in a continuous or semi-continuous manner with constant or intermittent addition of catalyst or catalyst components to the polymerization reactor.

In general, the productivity of an olefin polymerization catalyst exhibits an inverse relationship with selectivity so that many highly active polymerization catalysts have a good productivity but a relatively low stereospecificity. The catalysts of the invention exhibit good productivity while retaining desirably high stereospecificity so that the polymeric product obtained through the use of such a catalyst has good properties without the necessity of an extraction or deashing step.

The invention is further illustrated by the following Illustrative Embodiments which should be regarded as limiting.

ILLUSTRATIVE EMBODIMENT I

In an 8-ounce bottle, 2.0 g (10.5 mmol) of titanium tetrachloride, 3.76 g (15.7 mmol) of 95% titanium tetraethoxide, 8.12 g (71 mmol) of magnesium ethoxide and 0.94 g (8.7 mmol) of o-cresol were slurried in 100 g of chlorobenzene and 5.4 g of ethanol was added while the mixture was stirred at 440 rpm. The bottle was capped and immersed in an oil bath at 105° C. Within a few minutes, the magnesium ethoxide had dissolved but the solution remained murky. After about 1 hour, the cap was removed and the mixture was stirred for 2 additional hours and filtered while hot. The solids thus recovered were washed once with warm chlorobenzene, once with isooctane and dried under flowing nitrogen. The solids, 9.2 g, were nearly white, opaque spheroids.

ILLUSTRATIVE EMBODIMENT II

In a 2-liter flask equipped with a teflon stir paddle were slurried 39.6 g (165 mmol) of 95% titanium tetraethoxide, 81.2 g (710 mmol) of magnesium ethoxide, 9.4 g (86.7 mmol) of o-cresol, 52.5 g (1.14 mole) of ethanol and 800 g of chlorobenzene. While the mixture was stirred at about 300 rpm under a nitrogen blanket, a solution of 18 g (95 mmol) of titanium tetrachloride in 200 g of chlorobenzene was rapidly added. The flask was heated to 60°-65° C. and a nearly complete dissolution of all solids was obtained after about 2 hours. The temperature of the flask was then raised to 92° C. and a gentle stream of nitrogen was passed over the surface of the flask contents and the evolved ethanol was collected in a nitrogen bubber. After stirring overnight, the volume had decreased by about 5% and a murky solution was obtained. The slurry was filtered while warm and the solids thus recovered were washed once with chlorobenzene, twice with isooctane and dried under flowing nitrogen. A yield of 110.4 g of particles in the 15-70 micron size range was obtained. The particles were primarily opaque spheroids. The elemental analysis of the particles was 13.6% by weight magnesium and 8.1% by weight titanium.

ILLUSTRATIVE EMBODIMENT III

The olefin polymerization procatalyst precursors of each of Illustrative Embodiments I and II were converted to procatalysts by digesting for 60 minutes at 110° C. sufficient precursor to provide 30-50 mmol of magnesium in 150 ml of a 50/50 mixture by volume of chlorobenzene and titanium tetrachloride containing sufficient diisobutyl phthalate to provide a concentration of about 40 mmol/liter. This digest was followed by a first wash for 60 minutes at 110° C. with 150 ml of a fresh 50/50 mixture containing 6 mmol/liter of phthaloyl chloride. A second wash for 30 minutes at 110° C. with fresh 50/50 mixture then followed. The resulting solid was washed once with isooctane at 90° C. and twice with isooctane at room temperature and then dried with nitrogen at 50° C. The procatalyst obtained from the precursor of Illustrative Embodiment I was found to contain 2.4% by weight titanium, 18.7% by weight magnesium and 60.0% by weight chlorine. The procatalyst obtained from the precursor of Illustrative Embodiment II was found to contain 2.89% by weight titanium, 19.4% by weight magnesium and 59.8% by weight chlorine.

ILLUSTRATIVE EMBODIMENT IV

The procatalysts of Illustrative Embodiment IV were converted to olefin polymerization catalysts by mixing with triethylaluminum cocatalyst and diisobutyldimethoxysilane selectivity control agent. The quantities of catalyst components were such that the aluminum/silicon/titanium ratio was 70/20/1. The components were mixed prior to injection into a 1-liter autoclave containing propylene and the resulting slurry-phase polymerization employing liquid propylene as diluent took place at 67° C. for 1 hour. Molecular hydrogen, 43 mmol, was also added to the autoclave. The results of the polymerizations are given in the Table where the origin of the procatalyst precursor is indicated. Also shown by the terms H and R, respectively, are the situations where the catalyst was injected into the autoclave with contents already heated to 67° C. (H) and the case where the catalyst was injected into the autoclave at room temperature and the mixture was heated to 67° C. over about 15 minutes (R). The productivity of the catalyst is measured in terms of the kg of polymer obtained per g of procatalyst per hour. The stereospecificity of the catalyst is evaluated in terms of the xylene solubles content (termed XS) as measured in accordance with the regulations of the U.S. Food and Drug Administration. The test for xylene solubles is conducted by dissolving the polymer in xylene under reflux. The flask containing the dissolved polymer is then immersed in a water bath at 25° C. for 1 hour without stirring while the xylene insoluble portion precipitates. The precipitate is recovered by filtration and the solubles content is determined by evaporating an aliquot of the filtrate and drying and weighing the residue. The xylene content consists primarily of amorphous (atactic) polymer and low molecular weight crystalline polymer. Also in the Table the bulk density (BD) of the polymer is indicated in terms of g of polymer per cc. In each case the polymer consisted of essentially spheroidal particles.

TABLE

| Illustrative Embodiment Precursor | Injection | Productivity, kg/g cat hr | XS, % wt | BD g/cc |
|---|---|---|---|---|
| 1 | H | 35.4 | 3.3 | 0.390 |
|   | R | 36.6 | 3.2 | 0.447 |
| 2 | H | 33.1 | 3.5 | 0.413 |
|   | R | 50.0 | 3.2 | 0.471 |

What is claimed is:

1. In the process of polymerizing lower α-olefin by contacting lower α-olefin under polymerization conditions in the presence of an olefin polymerization catalyst formed from a titanium-based procatalyst, an organoaluminum cocatalyst and a selectivity control agent, the improvement of using as the procatalyst the olefin polymerization procatalyst produced by contacting an olefin procatalyst precursor obtained by heating a reaction mixture consisting essentially of a magnesium alkoxide wherein the alkoxide moieties independently have up to 4 carbon atoms inclusive, a titanium alkoxide wherein the alkoxide moieties independently have up to 4 carbon atoms inclusive, a titanium halide, a phenolic compound selected from phenol or phenol substituted with a group free from active hydrogen atoms which is ortho-para directing for aromatic ring substitution and an alkanol and removing alkanol from the resulting liquid mixture, with a tetravalent titanium halide, a halohydrocarbon and an electron donor.

2. The process of claim 1 wherein the tetravalent titanium halide is titanium tetrahalide.

3. The process of claim 2 wherein the electron donor is an alkyl ester of an aromatic monocarboxylic or dicarboxylic acid.

4. The process of claim 3 wherein the titanium tetrahalide is a titanium tetrachloride.

5. The process of claim 4 wherein the halohydrocarbon is chlorobenzene.

6. The process of claim 5 wherein the ester is ethyl benzoate or diisobutyl phthalate.

7. In the process of polymerizing propylene by contacting propylene under polymerization conditions in the presence of an olefin polymerization catalyst formed from a titanium-based procatalyst, an organoaluminum cocatalyst and a selectivity control agent, the improvement of using as procatalyst the olefin polymerization procatalyst produced by contacting an olefin polymerization procatalyst precursor obtained by heating a reaction mixture consisting essentially of magnesium ethoxide, titanium ethoxide, titanium tetrachloxide, a phenolic compound selected from phenol or phenol substituted by alkyl, alkoxy, halo or dialkylamino and ethanol and removing ethanol from the resulting liquid mixture, with titanium tetrachloride, a halohydrocarbon and an alkyl ester of an aromatic monocarboxylic or dicarboxylic acid.

8. The process of claim 7 wherein the ester is ethyl benzoate or diisobutyl phthalate.

9. The process of claim 8 wherein the halohydrocarbon is chlorobenzene.

10. The process of claim 9 wherein the ester is ethyl benzoate.

11. The process of claim 9 wherein the ester is diisobutyl phthalate.

* * * * *